United States Patent [19]

Lien

[11] Patent Number: 5,007,676
[45] Date of Patent: Apr. 16, 1991

[54] QUICK DETACHABLE VEHICLE SEAT COVER

[76] Inventor: Jack Lien, No. 30, Yen Chi Street, Kaohsiung, Taiwan

[21] Appl. No.: 420,404

[22] Filed: Oct. 12, 1989

[51] Int. Cl.$^5$ .............................................. A47K 27/00
[52] U.S. Cl. .................................... 297/218; 297/219; 24/306
[58] Field of Search ................ 297/218, 219, 220; 24/306, 696, 103, 112, 690; 248/205.2

[56] References Cited

U.S. PATENT DOCUMENTS

| | | | |
|---|---|---|---|
| 2,970,355 | 2/1961 | Hernon | 24/103 |
| 3,334,736 | 8/1967 | Cole et al. | 24/306 X |
| 3,405,408 | 10/1969 | Baker | 24/366 X |
| 3,453,696 | 7/1969 | Mates | 24/306 X |
| 3,531,833 | 10/1970 | Bignert | 24/103 |
| 3,695,690 | 10/1977 | Carson | 297/218 |
| 3,842,456 | 10/1974 | Bronstein, Jr. | 287/218 X |
| 4,232,898 | 11/1980 | Bodrero | 297/219 |
| 4,352,524 | 10/1982 | Crosby | 297/218 X |
| 4,591,148 | 5/1986 | Slator | 24/306 X |
| 4,709,183 | 11/1987 | Figueroa | 24/306 X |
| 4,879,787 | 11/1989 | Walls | 24/306 X |

FOREIGN PATENT DOCUMENTS

| | | | |
|---|---|---|---|
| 2298857 | 8/1976 | France | 248/205.2 |
| 179474 | 3/1962 | Sweden | 297/218 |
| 432750 | 9/1967 | Switzerland | 297/218 |

Primary Examiner—Jose V. Chen
Attorney, Agent, or Firm—Varndell Legal Group

[57] ABSTRACT

A quickly detachable vehicle seat cover includes a cover cloth for covering a vehicle seat and a plurality of fastening elements for securing the cloth cover to the vehicle seat. The cover cloth has Velcro strips attached thereto for connection with the Velcro strips of the fastening elements when the fastening elements are fastened to the vehicle seat. The fastening element includes flexible rubber pad having several grooves made thereon for securing thereto of several clips with a Velcro strip tightly attached thereto at the top through a high frequency heat welding process, such that the fastening element can be efficiently secured to a vehicle seat through the clips.

7 Claims, 8 Drawing Sheets

QUICK DETACHABLE VEHICLE SEAT COVER

BACKGROUND OF THE INVENTION

The conventional vehicle seat cover mounting process is very inconvenient. It utilizes a band tighten on a vehicle seat horizontally and another band tighten vertically. Both horizontally and vertically disposed two bands have Velcro (hook and loop fastner) strips fastened thereto at suitable locations. After the two bands are firmly secured to a vehicle seat, a cover cloth which has Velcro strips fastened thereto at the inner side at locations corresponding to the locations of the Velcro strips of the two bands is mounted on the vehicle seat with the Velcro strips of the cover cloth respectively engaged with the Velcro strips of the two bands. The drawbacks of this conventional method may include the followings:

(1) Expensive to manufacture: It is expensive to manufacture because an additional horizontal Velcro srtip attaching band and vertical Velcro strip attaching band are required;

(2) Inconvenient to operate: It is inconvenient to operate because a seat cushion must be detached before fastening of the horizontal and vertical bands;

(3) Easy to displace: When one is sitting on the seat cover, the seat cover tends to displace because the bands are loosely secured to the vehicle seat;

(4) Uncomfortable to sit on: It is uncomfortable to sit on the seat cover because the bands are set therebelow; and (5) Not practical in use: The horizontal and vertical bands must be changed according to the vehicle seat and cannot fit in with all kinds of seat covers.

It is therefore, the main object of the present invention to provide a rapid detachable vehicle seat cover which is easy to mount on a vehicle seat.

Another object of the present invention is to provide such a rapid detachable vehicle seat cover which can be smoothly and firmly attached to any curved surface region of a vehicle seat.

Still another object of the present invention is to provide such a rapid detachable vehicle seat cover which utilizes fastening elements to fasten a cover cloth to a vehicle seat.

Still another object of the present invention is to provide a rapid detachable vehicle seat cover in which the fastening element used includes a plurality of safety clips for insertion onto a vehicle seat so that the fastening element is firmly secured to the vehicle seat.

Still another object of the present invention is to provide a rapid detachable vehicle seat cover in which the fastening element used includes a corrugated bottom surface to firmly engage with the outer fabric of a vehicle seat when the clips of the fastening element are inserted therein.

Still another object of the present invention is to provide a rapid detachable vehicle seat cover in which the fastening elements are secured to the vehicle seat around its side wall region so as not to interfere with the smooth upper surface for comfortable sitting thereon.

A yet further object of the present invention is to provide a rapid detachable vehicle seat cover in which the fastening elements can be flexibly secured to the vehicle seat at any position, according to the type of the vehicle seat, which are suitable for mounting of a cover cloth smoothly and firmly thereon without causing any wrinkle.

DETAILED DESCRIPTION OF THE PREFERRED EMBODIMENTS

Figure 1:
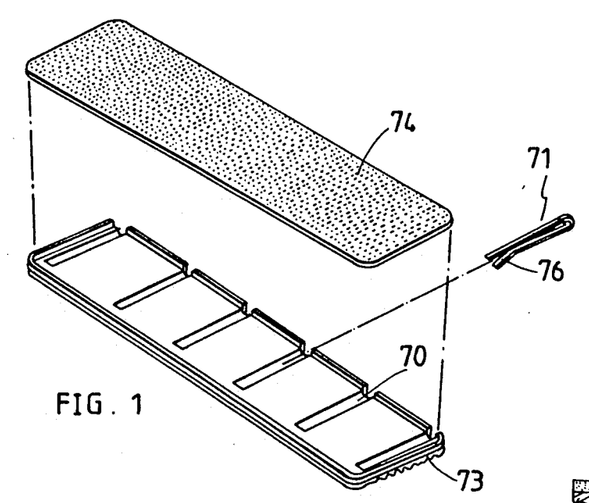
FIG. 1 is a perspective fragmentary view of a fastening element constructed according to the present invention.
Figure 2:
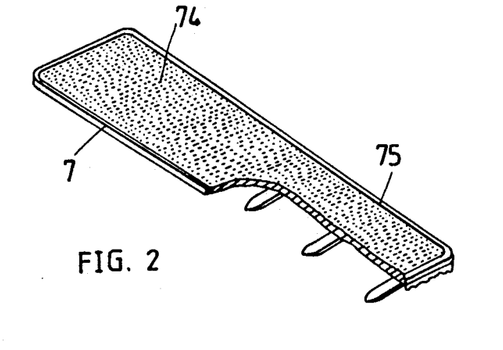
FIG. 2 is a perspective assembly view of the fastening element of FIG. 1.
Figure 3:
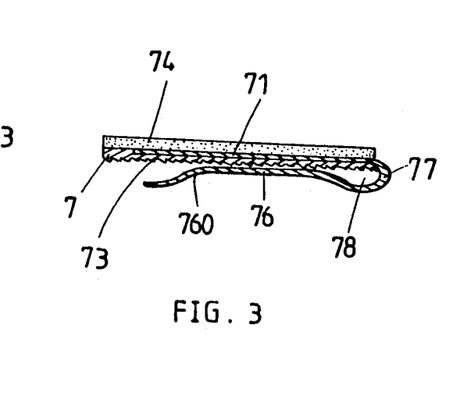
FIG. 3 is a sectional view of the fastening element of FIG. 1.
Figure 4:
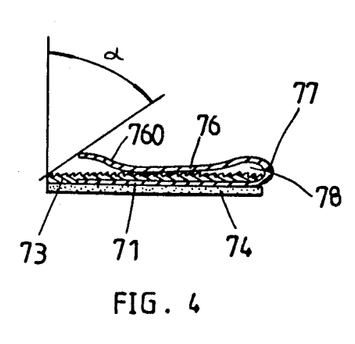
FIG. 4 is a schematic drawing illustrating a safety angle through the front end of the free half of a clip and the front end of a rubber pad in the fastening element of FIG. 1.
Figure 5:
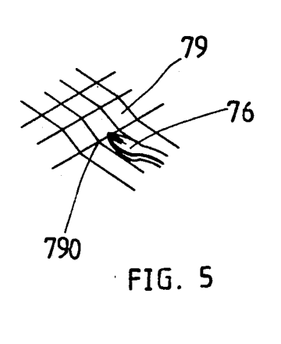
FIG. 5 is a detailed drawing illustrating the front end of the free half of a clip inserting through a mesh of a mesh fabric of a seat cushion.
Figure 6:
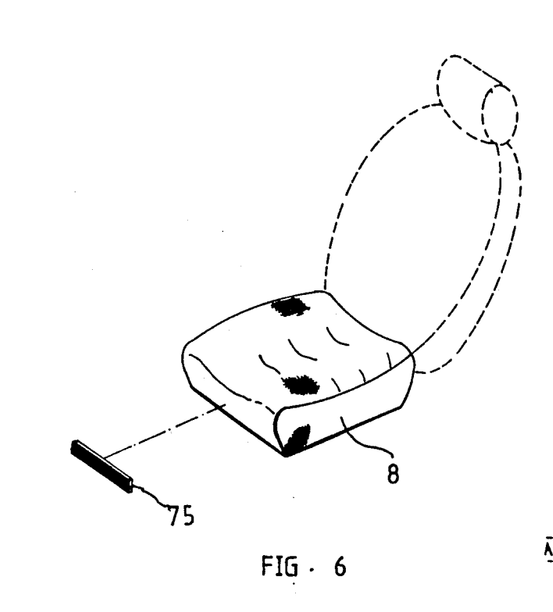
FIG. 6 is a schematic drawing illustrating the mounting of a fastening element of the present invention on a seat.
Figure 7:
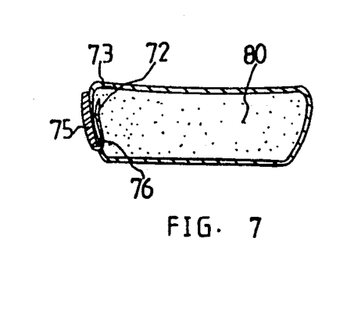
FIG. 7 is a sectional view illustrating a fastening element of the present invention secured to a seat cushion.
Figure 8:
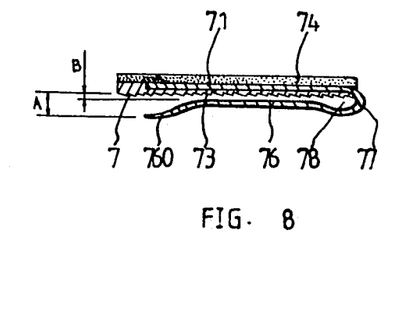
FIG. 8 is a schematic drawing illustrating insertion of a fabric through a front opening into a retaining space between the free half of a clip and the corrugated bottom surface of the rubber pad of a fastening element of the present invention.
Figure 9:
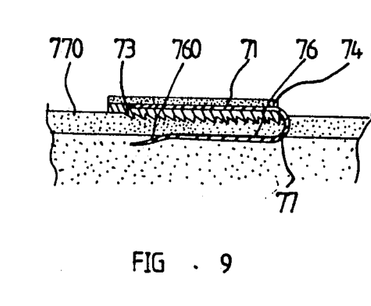
FIG. 9 is a schematic drawing, illustrating a fabric firmly engaged with the corrugated bottom surface of the rubber pad and the free half of a clip of a fastening element of the present invention.
Figure 10:
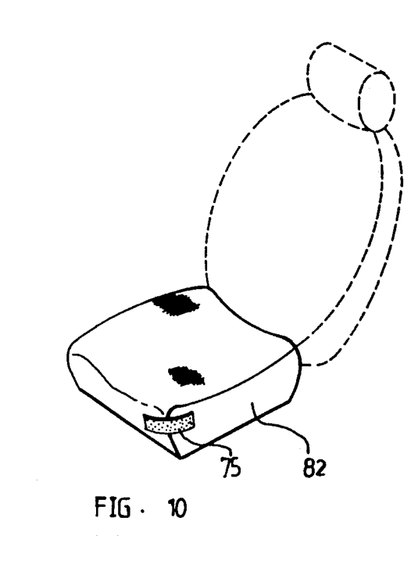
FIG. 10 is a schematic drawing illustrating a fastening element of the present invention secured to one corner of a seat.
Figure 11:
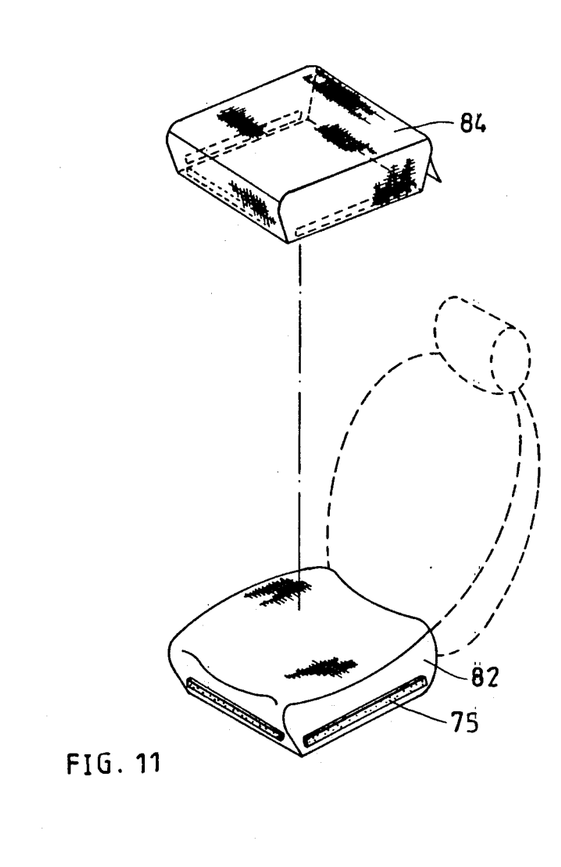
FIG. 11 is a schematic illustrating a vehicle front seat cover constructed according to the present invention for mounting on a vehicle front seat.
Figure 12:
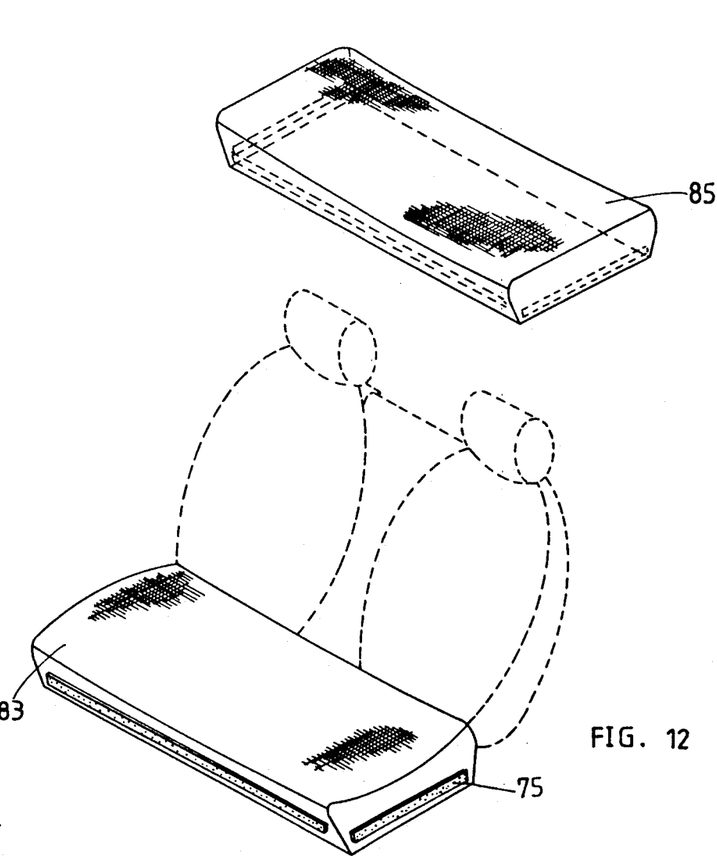
FIG. 12 is a schematic drawing illustrating a vehicle back seat cover constructed according to the present invention for mounting on a vehicle back seat.

Referring to FIGS. 1 and 2, therein illustrated is a fastening element 75 constructed according to the present invention, which includes a belt-like flexible rubber pad 7 having several grooves 70 made thereon for securing thereto of several clips 71, where the clips comprise a strip of material bent back upon itself to form two substantially parallel legs, one leg being straight and the other having bends in it. A Velcro strip (hook and loop fastener strip) covers the flexible rubber pad 7 and is tightly sealed thereto through a high frequency heat welding process with the upper halves of the clips 71 squeezed in therebetween, so that the other halves or the free halves 76 of the clips 71 extend downward and inward so as to suspend below the flexible rubber pad 7. The rubber pad has side edges defining an area for receiving the Velcro strip 74. Referring to FIGS. 3 and 4, the free half 76 of each clip 71 is generally parallel with the fixed upper half, which is firmly squeezed in between a rubber pad 7 and a Velcro strip 74. The clip can have a continuous structure with a bend 77 at the back end with the front end 760 of the free half 76 extending slightly away from the rubber pad 7 so as to define a space 78 between the free half 76 and the rubber pad 7 for receiving the fabric of a seat cushion. A safety angle a is provided between the the front end 760 of the free half 76 and the front end of the incorporated rubber pad 7 to protect one against injury during the fastening of the fastening element. The bottom side of the rubber pad 7 has a corrugated surface 73 to retain any fabric clipped opposite to the Velcro strip 74. Referring to FIGS. 5 and 6, the front end 760 of the free half 76 of each clip 71 is specially designed according to the mesh 79 of a seat cushion mesh fabric 780. When fastening a fastening element 75 of the present invention to the mesh fabric of a seat cushion, the front end 760 of the free half 76 of every clip 71 is pressed on the mesh fabric 790 and further inserted through a mesh 79 of the mesh fabric into the seat cushion. Because of the design of safety angle α, one will not be hurt by the front end 760 of the free half 76 of every clip 71 during fastening process. Referring to FIGS. 6 through 9, when securing a fastening element 75 of the present invention to a seat cushion by means of the clips 71 of the fastening element 75, the fabric 770 of the seat cushion is inserted from the front openings A defined between the front ends 760 of the clips 71 and the corrugated bottom surface 73 of the rubber pad 7 through the retaining spaces B between the free halves 76 of the clips 71 into the spaces 78 and the bends 77 of the clips 71. Because the retaining spaces B are much narrower than the front openings A, as soon as the fabric 770 is inserted into the retaining spaces B, it becomes firmly pressed by the free halves 76 of the clips 71 and engaged with the corrugated bottom surface 73 of the rubber pad 7 (see FIG. 9). Referring to FIGS. 10 through 12, since the fastening element 75 of the present invention is generally made of flexible rubber, it can be rapidly, flexibly and smoothly secured to a seat cushion at front side, lateral side or a corner (see FIG. 10). According to the present invention, the belt-like fastening element 75 is made in proper length according to requirement. When mounting a small seat cover 84 on a front seat 82 or a large seat cover 85 on a back seat 83 of a vehicle, a fastening element 75 each is secured to the seat 82 or 83 at the front side as well as the two lateral sides, with the Velcro strip 74 of the fastening element 75 outwardly exposed for securing the Velcro strips of the seat cover 84 or thereon. The Velcro strips of the seat cover are respectively secured to the sear cover 84 or 85 internally at the front and the two lateral sides thereof.

Figure 13:
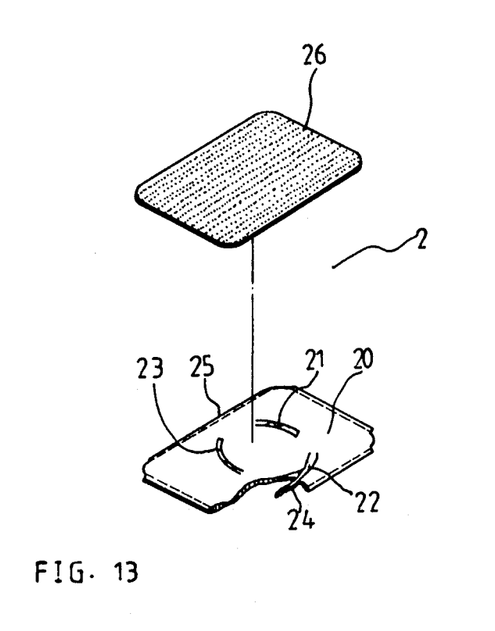
FIG. 13 is a perspective fragmentary view of an alternate form of a fastening element constructed according to the present invention.
Figure 14:
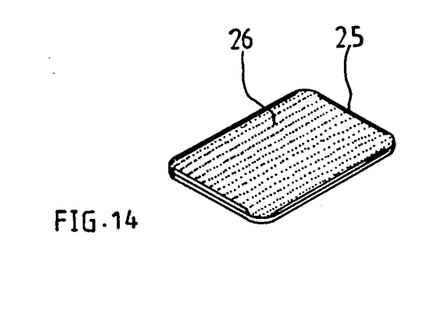
FIG. 14 is a perspective assembly view of a fastening element of FIG. 13.
Figure 15:
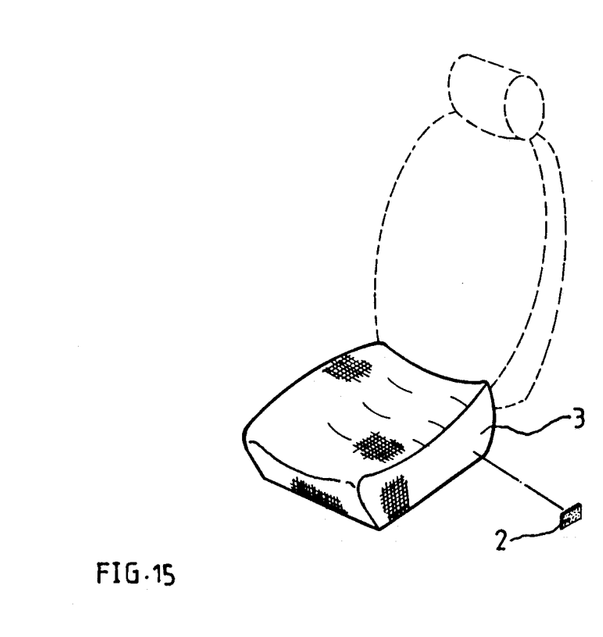
FIG. 15 is a schematic drawing illustrating the mounting of a fastening element of FIG. 13 onto a vehicle seat.
Figure 16:
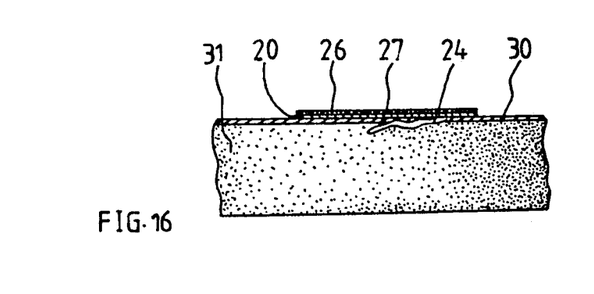
FIG. 16 is a sectional view of the fastening element of FIG. 13 when it is secured to a vehicle seat.
Figure 17:
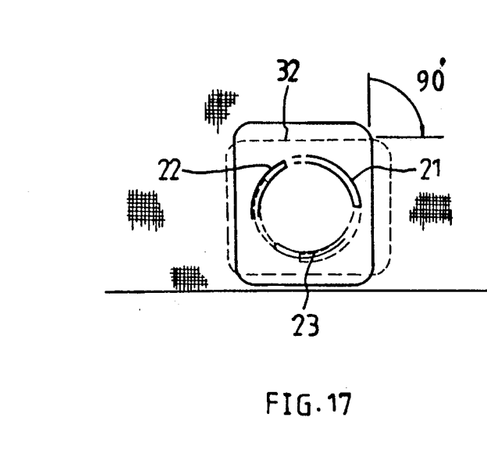
FIG. 17 is a schematic drawing illustrating the process to secure a fastening element of FIG. 13 to a seat cushion by turning the fastening element for an angle of 90° after the clamping members of the fastening element are inserted in the fabric of the seat cushion.
Figure 18:
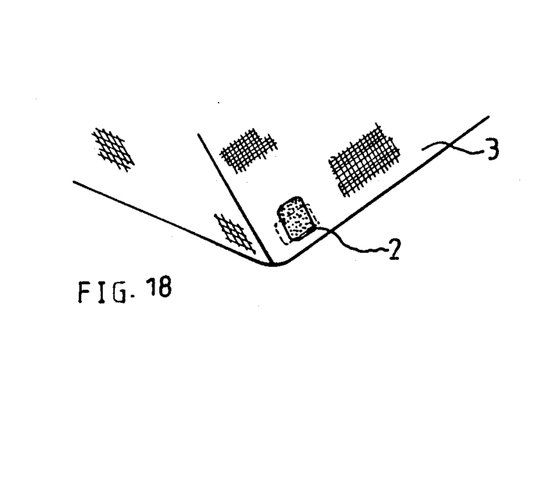
FIG. 18 is a schematic drawing illustrating the operation to secure a fastening element of FIG. 13 to a seat cushion.
Figure 19:
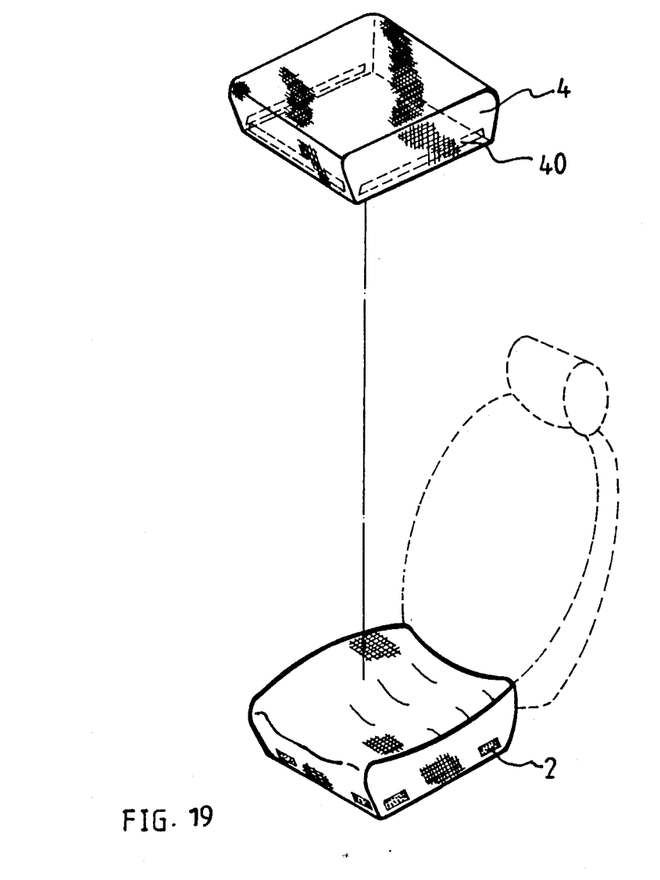
FIG. 19 is a schematic drawing illustrating the using a plurality of fastening elements made according to FIG. 13.
Figure 20:
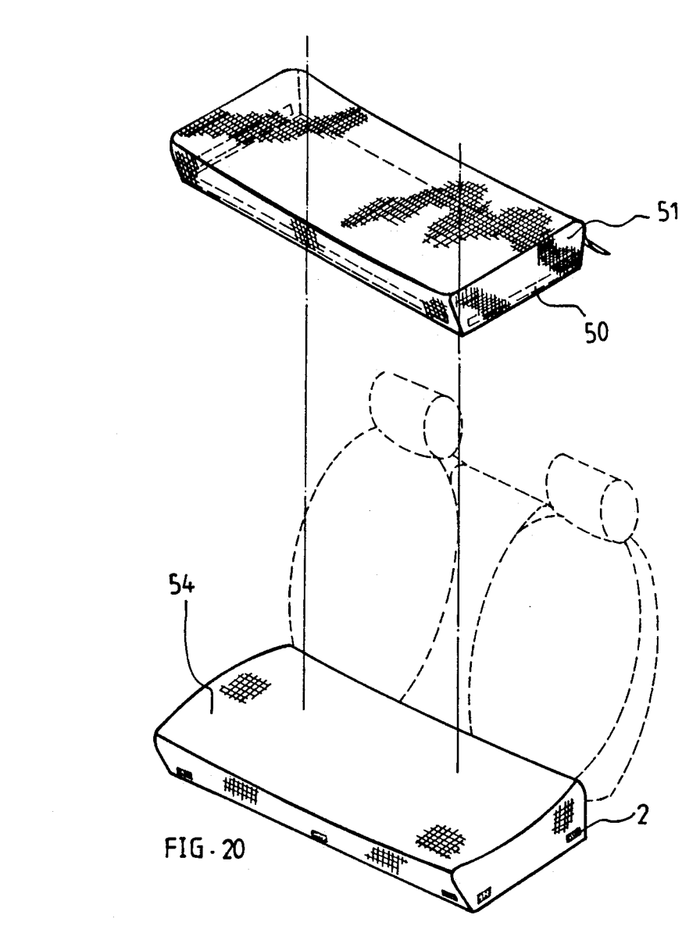
FIG. 20 is a schematic drawing illustrating the operation to secure a seat cover to a vehicle back seat by using a plurality of fastening elements made according to FIG. 13.
Figure 21:
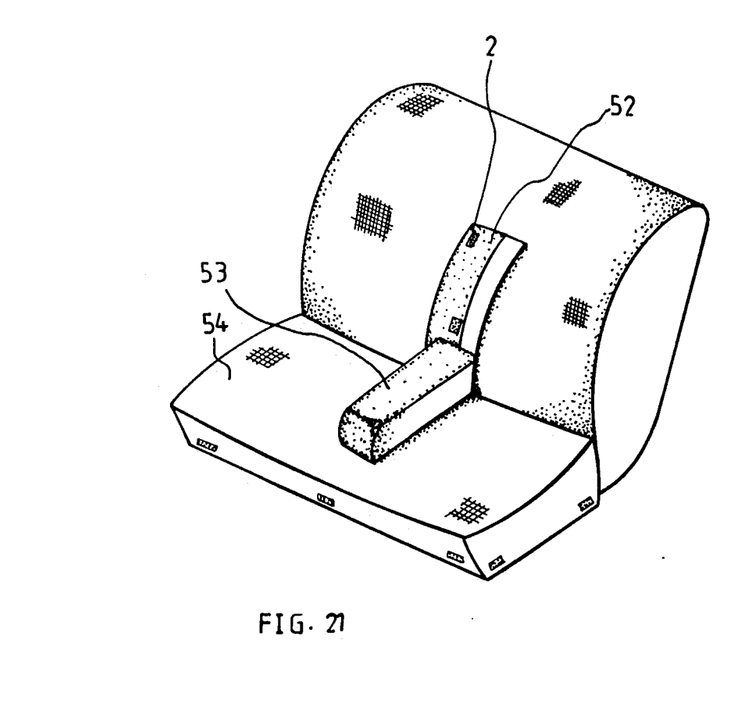
FIG. 21 is a schematic drawing illustrating the use of fastening elements made according to FIG. 13 in a concave surface of a vehicle back seat.

Referring to FIGS. 13 and 14, therein illustrated is an alternate form of a fastening element 2 constructed according to the present invention and generally comprised of a rectangular steel plate 20 with a patch of Velcro fabric 26 secured thereto. According to the present invention, the steel plate 20 comprises unitarily three corrugated 24 clamping members 21, 22 and 23 formed through a punching process and disposed around a circle in the center, and a folded side edge 25 defining a receiving space for setting therein of the patch of Velcro fabric 26. The operation of securing a fastening element 2 to a seat cushion is outlined in FIGS. 15 and 16. As illustrated, the front ends 27 of the clamping members 21, 22 and 23 are respectively inserted into the fabric 30 of the seat cushion 3 and the fastening element 2 is certain angle (according to the length of the clamping members. In this embodiment, it is designed that an angle of 90° will cause the fabric 30 to be firmly engaged by the corrugated 24 clamping members 21, 22 and 23 (see FIGS. 17 and 18). FIG. 19 illustrates the use of this type of fastening elements 2 for mounting a seat cover, in which a plurality of fastening elements 2 are respectively secured to a seat at the front and the two lateral sides thereof for subsequent securing thereto of a seat cover 4 which has Velcro strips 40 respectively attached thereto internally at the front and both lateral sides. FIGS. 20 and 21 illustrate the operation of securing a seat cover to a vehicle back seat by using a plurality of fastening elements of this alternate form. As illustrated, a plurality of fastening elements 2 are secured to the front and the two lateral side walls of a vehicle back seat 54 for connection thereto of the Velcro strips 50 of a back seat cover 51 so that the back seat cover 51 can be smoothly and firmly mounted on the vehicle back seat 54. According to the present invention, the fastening element 2 is particularly practical for smoothly securing a seat cover to a concave surface 52 (for example, the receiving cavity 52 of a hand-rest 53 of a vehicle back seat 54). Through the utilization of the fastening element 2, a seat cover can be smoothly and firmly secured to a vehicle seat (either front or back seat) and the fabric of the seat cover will not wrinkle.

Figure 22:
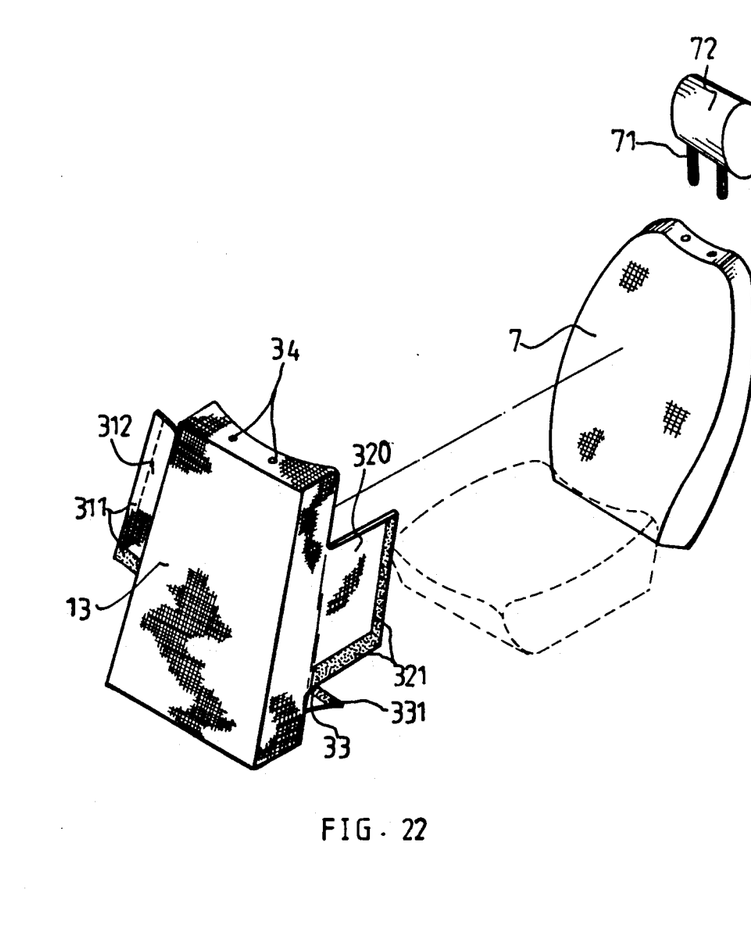
FIG. 22 is a schematic drawing illustrating an operation to mount a back cover of the present invention onto the back-rest of a vehicle front seat.
Figure 23:
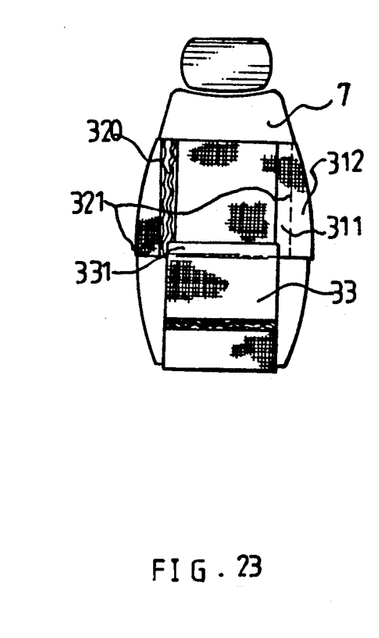
FIG. 23 is an assembly back view illustrating an operation to fasten up the extension panels of a back cover of the present invention at the back side of the back-rest of a vehicle front seat.
Figure 24:
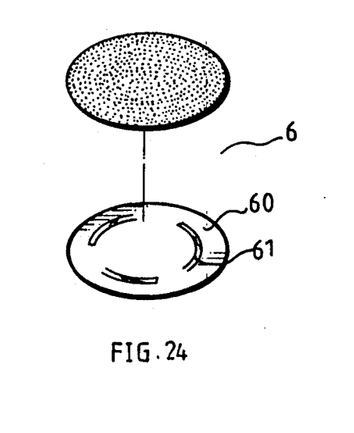
FIG. 24 illustrates a still another alternate form of fastening element according to the present invention.
Figure 25:
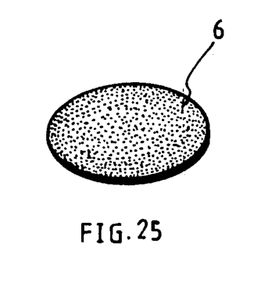
FIG. 25 is a perspective assembly view of the fastening element of FIG. 24.
Figure 26:
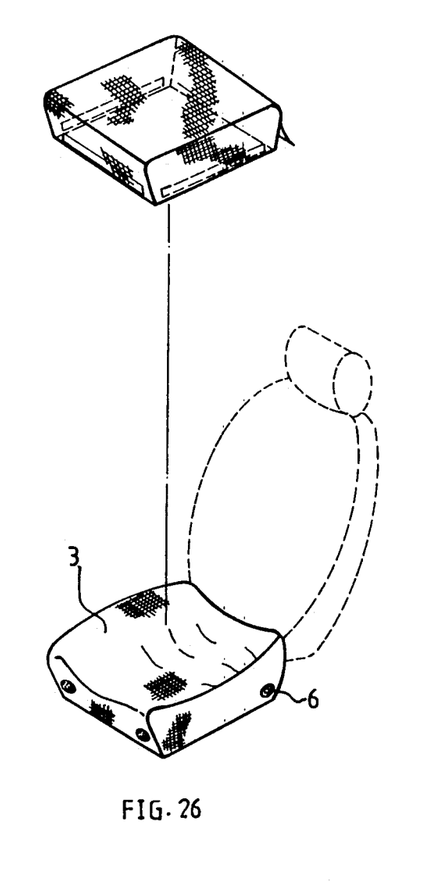
FIG. 26 illustrates the application of the fastening element of FIG. 24.
Figure 27:
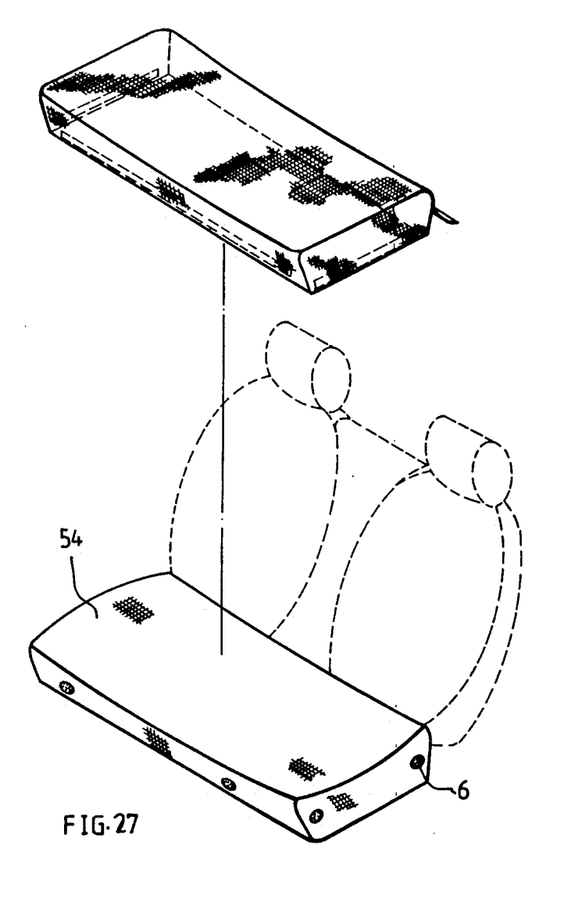
FIG. 27 illustrates the application of the fastening element of FIG. 24 to match with a vehicle back seat cover cloth.

FIGS. 22 and 23 illustrate the use of a back cover 13 constructed according to the present invention for fastening to the back-rest 7 of a vehicle front seat. The back cover 13 comprises two holes 34 made thereon at its top side for insertion therethrough of the two stems 71 of a head-rest 72 into the back-rest 7 of a vehicle front seat and thus becomes firmly retained on the back-rest 7 by the head-rest 72. The back cover 3 further includes three extension panels 312, 320 and 33, in which the extension panel 312 has a Velcro strip 311 internally secured thereto along the horizontal bottom edge and another Velcro strip 311 externally secured thereto along the vertical side edge; the extension panel 320 has a Velcro strip 321 externally secured thereto along the horizontal bottom edge and the vertical side edge; the extension panel 33 has a Velcro strip 331 internally secured thereto along the horizontal side edge. When the back cover 13 is mounted on the back-rest 7 of a vehicle front seat, the three extension panels 312, 320 and 33 cover the back side of the back-rest 7 with the extension panel 320 at the bottom, the extension panel 312 in the middle, and the extension panel 33 at the top, letting the Velcro strips 311, 321 and 331 be respectively engaged together. Through this arrangement, the back cover 13 can be rapidly mounted on the back-rest 7 of a vehicle front seat and easily removed therefrom.

Referring to FIGS. 24 through 27, therein illustrated is still another alternate form of the fastening element of the present invention. As illustrated, the fastening element is similar the the said first alternate form of fastening element of the present invention. In this embodiment, the fastening element 6 is comprised of a circular steel plate 60 having clamping members 61 in the center around a circle made through punching process. Besides the circular outer appearance, the whole structure is just the same as the fastening element 2.

Having shown and described preferred embodiments of the present invention by way of examples, it should be realized that structural changes could be made and other examples given without departing from either spirit or scope of this invention.

What is claimed is:

1. A rapidly detachable vehicle seat cover including:
  a cover cloth having a size corresponding to a vehicle seat and first fastening strips attached at its side edges;
  a plurality of fastening elements detachably secured to said vehicle seat and connecting said cover thereto; said fastening elements each including a belt-like flexible rubber pad having several grooves for receiving respective clips, and second fastening strips covering said flexible rubber pad and tightly sealed thereto by a high frequency heat welding process; said clips respectively having a fixed half secured between said flexible rubber pad and said second fastening strip and a free half suspended from said flexible rubber pad.

2. The rapidly detachable seat cover according to claim 1, wherein said clips respectively include a receiving space with a fabric of a seat cushion of said vehicle seat received therein, said fixed half and said free half of each of said clips formed by bending a strip of material back upon itself with said free half generally arranged in parallel to the fixed half defining said receiving space therebetween, said free half having a free end thereof extending away from said flexible rubber pad.

3. The rapidly detachable vehicle seat cover according to claim 1, wherein said rubber pad has a corrugated bottom surface arranged with said free half of said clip to grasp a fabric of said vehicle seat therebetween, and a side edge defining an area for receiving said second fastening strips.

4. The rapidly detachable vehicle seat cover according to claim 1, wherein said cover cloth is secured by interaction of said first and second fastening means and covers a back-rest of a vehicle front seat, said cover cloth having two holes its top for insertion therethrough of two stems of a head-rest and including a left extension panel, a right extension panel and a bottom extension panel, said left extension panel having fastening strips internally secured thereto along a horizontal bottom edge and externally secured thereto along a vertical side edge, said right extension panel having said fastening strips externally secured thereto along a horizontal bottom edge and a vertical side edge, and said bottom extension panel having fastening strips internally secured thereto along a horizontal side edge; and said left, right and bottom extension panels arranged together for covering a back side of said vehicle front seat by their corresponding fastening strips engaging each other with said right extension panel adjacent said back support, said left extension panel above said right extension panel, and said bottom extension panel above said right extension panel.

5. A rapidly detachable vehicle seat cover including:
  a cover cloth having a size corresponding to a vehicle seat and first fastening strips attached at its side edges;
  a plurality of fastening elements detachably secured to said vehicle seat and connecting said cover thereto; said fastening elements each comprise a steel plate with second fastening strips secured thereto, said second fastening strips detachably engaged with said first fastening strips, said steel plate including a plurality of clamping members for grasping said vehicle seat arranged in a circular orientation about a center of said steel plate.

6. The rapidly detachable vehicle seat cover according to claim 5, wherein said steel plate has a rectangular shape.

7. The rapidly detachable vehicle seat cover according to claim 5, wherein said steel plate has a circular shape.

* * * * *